United States Patent
Kerstetter et al.

(10) Patent No.: US 12,159,039 B2
(45) Date of Patent: Dec. 3, 2024

(54) ERROR LOGGING FOR A MEMORY DEVICE WITH ON-DIE WEAR LEVELING

(71) Applicant: Micron Technology, Inc., Boise, ID (US)

(72) Inventors: Bryan David Kerstetter, Kuna, ID (US); Donald M. Morgan, Meridian, ID (US); Alan J. Wilson, Boise, ID (US); John David Porter, Boise, ID (US); Jeffrey P. Wright, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 193 days.

(21) Appl. No.: 17/731,100

(22) Filed: Apr. 27, 2022

(65) Prior Publication Data
US 2023/0350574 A1 Nov. 2, 2023

(51) Int. Cl.
*G06F 3/06* (2006.01)

(52) U.S. Cl.
CPC .......... *G06F 3/0619* (2013.01); *G06F 3/0653* (2013.01); *G06F 3/0676* (2013.01); *G06F 3/0679* (2013.01)

(58) Field of Classification Search
CPC .... G06F 3/0619; G06F 3/0653; G06F 3/0676; G06F 3/0679
See application file for complete search history.

(56) References Cited

U.S. PATENT DOCUMENTS

| | | | |
|---|---|---|---|
| 11,042,490 B2 | 6/2021 | Morgan et al. | |
| 2014/0351628 A1* | 11/2014 | Higeta | G06F 11/1048 714/6.11 |
| 2019/0129850 A1* | 5/2019 | Chang | G06F 12/0804 |
| 2023/0305924 A1* | 9/2023 | Nemati | G06F 11/0772 |

* cited by examiner

*Primary Examiner* — Hiep T Nguyen
(74) *Attorney, Agent, or Firm* — Greenberg Traurig

(57) ABSTRACT

Systems, methods and apparatuses to log memory errors in memory devices that can perform wear leveling based on physical addresses used in the memory devices to address select memory cells. For example, a controller of a memory sub-system communicates with a memory device installed in the memory sub-system to access memory cells in the memory device. During the communication to access memory cells in the memory device, the controller can determine a memory error at a first address. If the controller transmits the first address to the memory device for memory access at the time of the memory error, the memory device converts the first address to a second address to perform the memory access. The controller can be configured to determine the second address and record, in an error log, the memory error in association with the second address.

20 Claims, 7 Drawing Sheets

ERROR LOGGING FOR A MEMORY DEVICE WITH ON-DIE WEAR LEVELING

TECHNICAL FIELD

At least some embodiments disclosed herein relate to memory systems in general and, more particularly but not limited to, techniques of logging locations of memory errors in memory devices that can dynamically map received memory addresses to physical memory addresses.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

A memory device can include a memory integrated circuit having one or more arrays of memory cells formed on an integrated circuit die of semiconducting material. A memory cell is a smallest unit of memory that can be individually used or operated upon to store data. In general, a memory cell can store one or more bits of data.

Different types of memory cells have been developed for memory integrated circuits, such as random access memory (RAM), read-only memory (ROM), dynamic random access memory (DRAM), static random access memory (SRAM), synchronous dynamic random access memory (SDRAM), phase change memory (PCM), magneto random access memory (MRAM), negative-or (NOR) flash memory, electrically erasable programmable read-only memory (EEPROM), flash memory, etc.

Some integrated circuit memory cells are volatile and require power to maintain data stored in the cells. Examples of volatile memory include Dynamic Random-Access Memory (DRAM) and Static Random-Access Memory (SRAM).

Some integrated circuit memory cells are non-volatile and can retain stored data even when not powered. Examples of non-volatile memory include flash memory, Read-Only Memory (ROM), Programmable Read-Only Memory (PROM), Erasable Programmable Read-Only Memory (EPROM) and Electronically Erasable Programmable Read-Only Memory (EEPROM) memory, etc. Flash memory includes negative-and (NAND) type flash memory or a negative-or (NOR) type flash memory. A NAND memory cell is based on a NAND logic gate; and a NOR memory cell is based on a NOR logic gate.

Cross-point memory (e.g., 3D XPoint memory) uses an array of non-volatile memory cells. The memory cells in cross-point memory are transistor-less. Each of such memory cells can have a selector device and optionally a phase-change memory device that are stacked together as a column in an integrated circuit. Memory cells of such columns are connected in the integrated circuit via two layers of wires running in directions that are perpendicular to each other. One of the two layers is above the memory cells; and the other layer is below the memory cells. Thus, each memory cell can be individually selected at a cross point of two wires running in different directions in two layers. Cross point memory devices are fast and non-volatile and can be used as a unified memory pool for processing and storage.

A non-volatile integrated circuit memory cell can be programmed to store data by applying a voltage or a pattern of voltage to the memory cell during a program/write operation. The program/write operation sets the memory cell in a state that corresponds to the data being programmed/stored into the memory cell. The data stored in the memory cell can be retrieved in a read operation by examining the state of the memory cell. The read operation determines the state of the memory cell by applying a voltage and determining whether the memory cell becomes conductive at a voltage corresponding to a pre-defined state.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
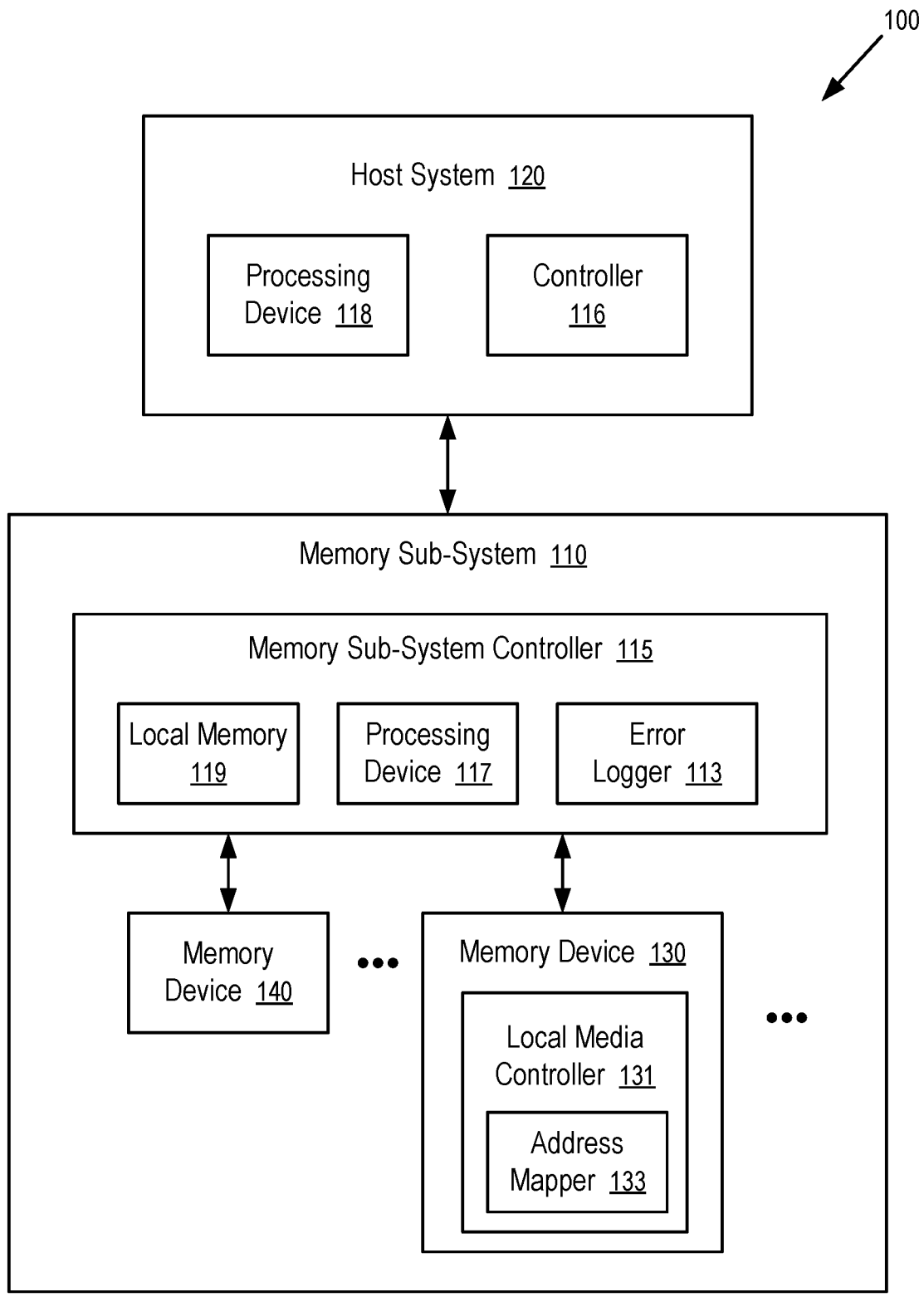
FIG. 1 illustrates an example computing system having a memory sub-system in accordance with some embodiments of the present disclosure.

At least some aspects of the present disclosure are directed to a memory sub-system configured to log physical addresses of memory errors in a memory device that autonomously convert logical addresses to physical addresses.

In general, memory cells in a memory device may degrade and fail. Some memory operations, such as programming a memory cell to have a state representing data being written into the memory cell, can cause incremental wear on memory cells being operated upon. A wear leveling scheme can be used to evenly distribute such operations among the memory cells so that no portion of the memory device fails prematurely during the designed service life of the memory device.

In some implementations, a memory device has address mapping functionality to facilitate wear leveling. The memory device can receive a command to store data at, or retrieve data from, a memory location represented by an address specified for the command. Such an address can be considered a logical address that is used by devices (e.g., controllers, hosts, etc.) outside of the memory device to identify a memory location in the memory device. To perform an operation at the memory location (e.g., to store or retrieve data), the address mapping functionality of the memory device can be used to convert the logical address to a physical address. The memory device performs the operation by addressing/selecting a memory cell using the physical address.

During a wear leveling operation, the data identified by a logical address and stored in a memory cell represented by a physical address can be moved to another memory cell having a different physical address. To allow the data to be accessed via the same logical address, the memory device can update the mapping between logical addresses and physical addresses such that the logical address is mapped to the different physical address of the memory cell that is currently storing the data. As a result, a same logical address may be mapped to different physical addresses at different time instances; and different logical address may be mapped to a same physical address at different time instances.

Optionally, the memory device can implement address scrambling (obfuscation) to mitigate targeted wear leveling attacks and/or to augment the efficacy of a wear leveling scheme. For example, the memory device can use a scramble key to transform a received logical address into an intermediate address that is further mapped to a physical address according to a set of parameters and a predefined formula.

The address mapping functionality of a memory device can shield a host or a controller from changes of physical addresses of memory cells in the memory devices. However, such shielding can be a challenge in tracking and processing errors in memory cells.

At least one embodiment disclosed herein provides techniques to offer a host or external controller of a memory device the visibility into the physical addresses used in the memory device to select memory cells for memory operations (e.g., read, write, erase).

For example, when there is an error in reading data, the host or external controller can obtain the physical address of the error from the memory device, or compute the physical address of the error based on mapping parameters used by the memory device to perform address mapping. Such mapping parameters can include the scramble key used to generate intermediate addresses before the intermediate addresses are further converted to physical addresses.

Thus, the host or external controller of the memory device can log and/or track memory errors at memory cells using physical addresses. The physical addresses representing memory cells do not change over time for the memory cells (e.g., no change in the physical address of a memory cell before and after a wear leveling operation). In contrast, the logical addresses as identification of memory cells can change over time, because data addressed by the logical addresses can be moved from memory cells to other memory cells during a wear leveling operation. Thus, logical addresses are not statically, fixedly associated with memory cells due to the dynamic address mapping performed by the memory device.

A same memory cell can be addressed by different logical addresses at different time instances. Thus, errors in the memory cell detected at different time instances can be logged for association with different logical addresses, which obfuscates the association between the errors and the memory cell. When errors are logged in association with physical addresses, the errors happening in a same memory cell can be identified for being associated with a same physical address.

Thus, it is advantageous to track memory errors in association with physical addresses used in the memory devices to select or address memory cells. Reliability measurements of memory cells represented by physical addresses can be generated from the memory errors in association with the physical addresses. Such measurements can be used to perform operations to enhance reliability of data stored in the memory device. For example, memory cells can be selected based on reliability measurements of memory cells or physical addresses for post package repair. For example, data in less reliable memory cells can be replicated and stored in other memory cells. For example, data can be selectively store in more reliable memory cells; and storing of data in less reliable memory cells can be avoided.

When a failed read is encountered, the logical address is mapped to a physical address representing a physical location in the memory device. The physical address can have different logical addresses over time due to wear leveling operations. The failed read may not be identified for processing (e.g., for selecting a memory location for post package repair) until after many wear leveling operations that change the logical address of the physical address. Thus, the initial logical address, as recorded for the failed read based on its association with the physical address at the time of the error, may not represent the same physical address at the time of selecting memory locations for repair. Further, different failed reads can occur at the same physical address but reported at different logical addresses that appear to suggest errors at different memory locations. When the failed reads are recorded in association with physical addresses of the failed reads, ambiguities in locations of memory failures over time can be eliminated.

The host or external controller can be configured to obtain the physical address computed in the memory device for a logical address to perform an operation (e.g., read, write, erase). With the visibility to the physical address used in the memory device, memory errors detected in the memory device at physical locations can be logged and tracked based on the physical memory locations fixedly represented by their corresponding physical addresses. When repair is performed at a location represented by a physical address of a memory error, the repair is guaranteed to target the corresponding memory cell associated with the memory error.

In one embodiment, a memory device has a local media controller configured to perform on-die wear leveling by changing mapping between logical addresses and physical addresses. The logical addresses are received from a host or memory controller to identify memory locations in a logical address space; and the physical addresses are used to address memory cells programmed to store data for the logical addresses. The address mapping between logical addresses and physical addresses changes after each wear leveling operation.

To provide the host or memory controller with visibility into physical addresses of memory errors in the memory device, parameters used by the memory device to perform the address mapping can be communicated from the memory device to the host or memory controller (e.g., during a power up process of the memory sub-system). Subsequently, the host or memory controller can update the parameters for each wear leveling operation in a same way as the memory device. Thus, the host or memory controller has a same set of parameters for memory mapping as the memory device. While the memory device translates a logical address into a physical address for memory operations, the host or memory controller can independently determine the physical address using mapping parameters that are in synchronization with the mapping parameters in the memory device. The visibility of the host or memory controller into physical addresses used in the memory device allows the host or memory controller to log memory errors with physical addresses. The identification of physical addresses of the memory locations of errors allow the host or memory controller to target the correct memory locations for post package repair after many wear leveling operations performed following the memory errors.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or such a computing device that includes memory and a processing device.

The computing system 100 can include a host system 120 that is coupled to one or more memory sub-systems 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset (e.g., processing device 118) and a software stack executed by the processor chipset. The processor chipset can include one or more cores, one or more caches, a memory controller (e.g., controller 116) (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, a universal serial bus (USB) interface, a Fibre Channel, a Serial Attached SCSI (SAS) interface, a double data rate (DDR) memory bus interface, a Small Computer System Interface (SCSI), a dual in-line memory module (DIMM) interface (e.g., DIMM socket interface that supports Double Data Rate (DDR)), an Open NAND Flash Interface (ONFI), a Double Data Rate (DDR) interface, a Low Power Double Data Rate (LPDDR) interface, or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The processing device 118 of the host system 120 can be, for example, a microprocessor, a central processing unit (CPU), a processing core of a processor, an execution unit, etc. In some instances, the controller 116 can be referred to as a memory controller, a memory management unit, and/or an initiator. In one example, the controller 116 controls the communications over a bus coupled between the host system 120 and the memory sub-system 110. In general, the controller 116 can send commands or requests to the memory sub-system 110 for desired access to memory devices 130, 140. The controller 116 can further include interface circuitry to communicate with the memory sub-system 110. The interface circuitry can convert responses received from the memory sub-system 110 into information for the host system 120.

The controller 116 of the host system 120 can communicate with the controller 115 of the memory sub-system 110 to perform operations such as reading data, writing data, or erasing data at the memory devices 130, 140 and other such operations. In some instances, the controller 116 is integrated within the same package of the processing device 118. In other instances, the controller 116 is separate from the package of the processing device 118. The controller 116 and/or the processing device 118 can include hardware such as one or more integrated circuits (ICs) and/or discrete components, a buffer memory, a cache memory, or a combination thereof. The controller 116 and/or the processing device 118 can be a microcontroller, special purpose logic circuitry (e.g., a field programmable gate array (FPGA), an application specific integrated circuit (ASIC), etc.), or another suitable processor.

The memory devices 130, 140 can include any combination of the different types of non-volatile memory components and/or volatile memory components. The volatile memory devices (e.g., memory device 140) can be, but are not limited to, random access memory (RAM), such as dynamic random access memory (DRAM) and synchronous dynamic random access memory (SDRAM).

Some examples of non-volatile memory components include a negative-and (or, NOT AND) (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs, or any combination of such. In some embodiments, a particular memory device can include an SLC portion, an MLC portion, a TLC portion, a QLC portion, and/or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory devices such as 3D cross-point type and NAND type memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations (e.g., in response to commands scheduled on a command bus by controller 116). The controller 115 can include hardware such as one or more integrated circuits (ICs) and/or discrete components, a buffer memory, or a combination thereof. The hardware can include digital circuitry with dedicated (e.g., hard-coded) logic to perform the operations described herein. The controller 115 can be a microcontroller, special purpose logic circuitry (e.g., a field programmable gate array (FPGA), an application specific integrated circuit (ASIC), etc.), or another suitable processor.

The controller 115 can include a processing device 117 (e.g., processor) configured to execute instructions stored in a local memory 119. In the illustrated example, the local memory 119 of the controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the controller 115, in another embodiment of the present disclosure, a memory sub-system 110 does not include a controller 115, and can instead rely upon external control (e.g., provided by an external host, or by a processor or controller separate from the memory sub-system).

In general, the controller 115 can receive commands or operations from the host system 120 and can convert the commands or operations into instructions or appropriate commands to achieve the desired access to the memory devices 130. The controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the controller 115 and decode the address to access the memory devices 130.

In some embodiments, the memory devices 130 include local media controllers 131 that operate in conjunction with the memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local media controller 131) for media management within the same memory device package. An example of a managed memory device is a managed NAND (MNAND) device.

The controller 115 can include an error logger 113 configured to record errors encountered in the memory devices 130, . . . , 140 of the memory sub-system 110. The controller 115 can send commands to a memory device (e.g., 130) to perform memory operations (e.g., read, write, erase) and specify addresses for the commands to identify memory locations for the performance of the memory operations. The memory device 130 can receive the addresses, provided by the controller 115 for the command, as logical addresses and use an address mapper 133 to convert the logical addresses to physical addresses. The memory device 130 uses the physical addresses to address/select memory cells in the memory device 130 to perform the memory operations. The address mapper 133 can change the mapping used to convert the logical addresses to the physical addresses to implement wear leveling operations in the memory device 130. The association between the physical addresses and the memory cells being addressed is fixed and does not change (e.g., in response to wear leveling operations in the memory device 130). Thus, the physical addresses are more accurate than the logical addresses in identifying memory cells in the memory device 130 over time (e.g., before and after wear leveling operations in the memory device 130). The error logger 113 is configured to obtain physical addresses, determined by the address mapper 133 to perform memory operations at locations specified by the controller 115 via logical addresses. The error logger 113 is configured to log memory errors in the memory device 130 in association with the physical addresses.

In some embodiments, the controller 115 in the memory sub-system 110 includes at least a portion of the error logger 113. In other embodiments, or in combination, the controller 116 and/or the processing device 118 in the host system 120 includes at least a portion of the error logger 113. For example, the controller 115, the controller 116, and/or the processing device 118 can include logic circuitry implementing the error logger 113. For example, the controller 115, or the processing device 118 (e.g., processor) of the host system 120, can be configured to execute instructions stored in memory for performing the operations of the error logger 113 described herein. In some embodiments, the error logger 113 is implemented at least in part in an integrated circuit chip (e.g., memory device 130) installed in the memory sub-system 110. In other embodiments, the error logger 113 can be part of firmware of the memory sub-system 110, an operating system of the host system 120, a device driver, or an application, or any combination therein.

In one embodiment, the local media controller 131 of the memory device is configured to perform on die wear leveling operations. The memory device 130 has a number of rows of memory cells and an extra row of memory cells for rotation. A subset of the rows of memory cells can be selected for use as the same number of rows of memory cells being addressed via a logical row address. A physical row address of a row within the subset can be computed from the logical row address based on one or more mapping parameters. Optionally, the logical row address can be scrambled according to a key to generate an intermediate row address; and the physical row address can be computed from the intermediate row address. The operation of scramble in the logical row address can be considered part of the computation to compute the physical row address according to a predetermined function and mapping parameters that include the scramble key.

A communication protocol between the memory sub-system controller 115 and the memory device 130 can be configured to allow the controller 115 to have visibility into the physical addresses computed by the address mapper 133 in the memory device 130.

For example, in response to a determination of a memory error, the error logger 113 in the controller 115 can send a request to the memory device 130. The request identifies the logical address having the memory error; the address mapper 133 in the memory device 130 can compute the corresponding the physical address for the received logical address; and the memory device 130 can provide a reply to the request and include the physical address in the reply. When the request is sent before a wear leveling operation that can change the mapping used by the address mapper 133, the physical address received in the reply is accurate in identifying memory cells having the memory error.

For example, the memory device 130 can perform decoding of Error Correction Code (ECC) and can detect an error in retrieved data from memory cells in the memory device 130. In response to a detected error, the memory device 130 can report the error to the controller 115; and the report can include the physical address used in addressing the respective memory cells. The error logger 113 can be configured to use the physical address provided by the memory device 130 in reporting the memory error.

Alternatively, the error logger 113 in the controller 115 can send to request to the memory device 130 for a copy of mapping parameters of the address mapper 133 (e.g., during a power up process of the memory sub-system 110). For improved security, the copy of mapping parameters can be communicated from the memory device 130 to the controller in an encrypted form. For example, a secret encryption key to secure communication from the memory device 130 to the controller 115 can be programmed during manufacturing of the memory sub-system 110 and/or the memory device 130. Subsequently, when a wear leveling operation is performed in the memory device 130 (e.g., in response to a command send from the controller 115 to the memory device 130), the error logger 113 can be configured to update its copy of the mapping parameters in the same way as the address mapper 133. In response to a memory error, the error logger 113 can compute the physical address of the memory error using its copy of the mapping parameters, without the need to ask the memory device 130 about the physical address.

Thus, the controller 115 can have visibility into physical addresses associated with memory error events despite address obfuscation and/or change due to on die wear leveling. The error logger 113 in the controller 115 can accurately record memory error locations in the memory device 130 over time after the memory device 130 performs on die wear leveling with address obfuscation. Optionally, the controller 115 (and the error logger 113) and the memory device 130 can independently track of wear leveling pointers and independently compute the same physical addresses used in memory operations in the memory device 130.

Optionally, when reporting memory errors to the host system 120, the controller 115 can obfuscate the physical addresses of the memory errors identified to the host system 120. For example, the controller 115 can report a scrambled version of the physical addresses of the memory errors to the host system 120. For example, the controller 115 can report the logical addresses at the time of the memory errors as the physical addresses of the memory errors identified to the host system 120.

Based on the error log recorded by the error logger 113, the host system 120 and/or the controller 115 can select one or more memory locations for post package repair. The physical address communicated from the controller 115 to the memory device 130 to request post package repair can be in an obfuscated form for improved security.

Optionally, the error logger 113 can filter its recorded instances of memory errors in reporting to the host system 120.

The memory errors recorded by the error logger 113 can be used to identify an unreliable portion of memory cells in the memory device 130 (e.g., a page of memory cells) to enable early retirement of the unreliable portion from memory services.

Optionally, the controller 115 can generate at least a portion of the mapper parameters used by the address mapper 133 (e.g., scramble key and/or other mapping parameters). The controller 115 can instruct the memory device 130 to use its generated mapper parameters during an initialization process of the memory device 130 and/or the memory sub-system 110. Thus, it is not necessary to retrieve such mapping parameters from the memory device 130.

Figure 2:
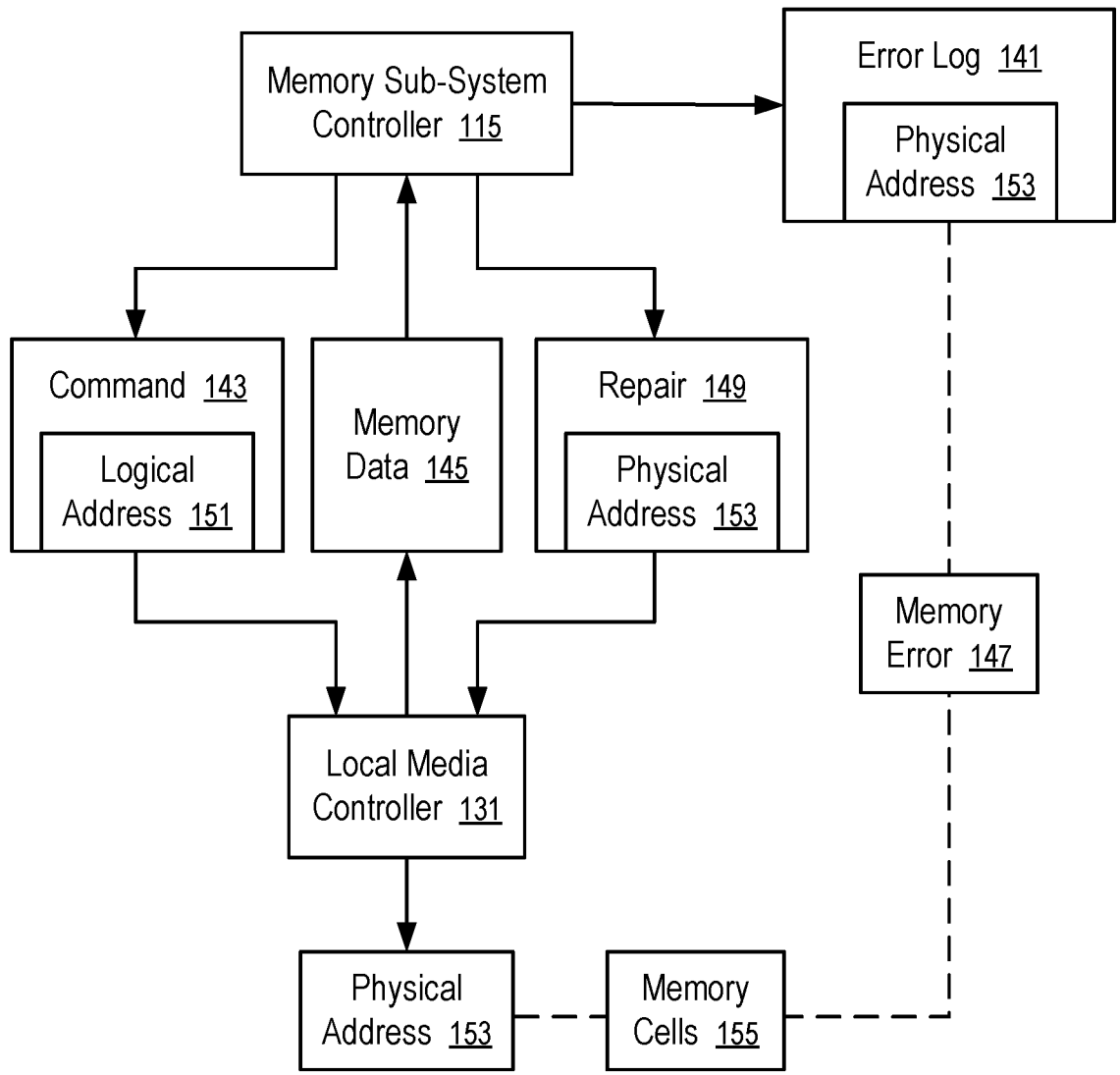
FIG. 2 illustrates processing of memory errors according to one embodiment.

FIG. 2 illustrates processing of memory errors according to one embodiment. For example, the processing can be implemented in a memory sub-system 110 of FIG. 1.

In FIG. 2, a memory sub-system controller 115 can send a command 143 to access a memory location represented by a logical address 151. For example, the command 143 can be a write command to store data at a location represented by the logical address 151. For example, the command 143 can be a read command to retrieve data from the location represented by the logical address 151.

In FIG. 2, the address 151 is logical to the local media controller 131, since the location represented by the address 151 can be at different physical locations in the memory device 130 (e.g., as the result of wear leveling operations in the memory device 130).

When the local media controller 131 receives the command 143, the address mapper 133 converts the logical address 151 into a physical address 153 according to its current mapping parameters. The physical address 153 represents memory cells 155; and the representation of the memory cells 155 by the physical address 153 does not change after wear leveling operations.

When the command 143 requests the read of data at the logical address 151, the local media controller 131 can execute the command 143 and provide reply containing the memory data 145 received from the memory cells 155 represented by the physical address 153.

Typically, data stored in the memory cells 155 are encoded using an Error Correction Code (ECC). After memory data 145 is determined from the current states of the memory cells 155, the memory data 145 can be decoded to detect and/or correct errors in the memory data 145. When there are many bit errors exceeding the correction capability of a decoder, the decoding can fail; and a memory error 147 is detected. In some instances, the decoding can succeed after a number of read retries. In other instances, the decoding can fail even after a number of retries.

In some implementations, the memory device 130 has a decoder; and a decoding failure indicates a memory error 147 in the memory cells 155. The local media controller 131 can provide an indication of the memory error 147 in the reply containing the memory data 145, or report the memory error 147 instead of the memory data 145.

In some implementations, the memory sub-system controller 115 can have a decoder to detect a memory error 147.

The error logger 113 in the memory sub-system controller 115 can record instances of memory errors. The errors can be detected by the decoder in the memory device 130 and/or the decoder in the memory sub-system controller 115. The error logger 113 is configured to record the memory error 147 in the error log 141 as being at the physical address 153.

The error logger 113 can obtain the physical address 153 of the memory error 147 using one of the techniques disclosed herein.

For example, when the local media controller 131 reports a detected memory error 147, the local media controller 131 can include the physical address 153 in the report.

For example, when the memory sub-system controller 115 detects the memory error 147 via decoding the memory data 145 retrieved from the logical address 151, the error logger 113 can send a command containing the logical address 151 to request the local media controller 131 to report the physical address 153 of the logical address 151.

For example, the memory sub-system controller 115 and/or the error logger 113 can have a copy of mapping parameters in synchronization with the mapping parameters of the address mapper 133 in the memory device 130. For example, when the address mapper 133 adjusts its mapping parameters in response to a wear leveling operation, the memory sub-system controller 115 can make the same adjustments to its copy of the mapping parameters. In response to the memory error 147 at the logical address 151, the memory sub-system controller 115 and/or the error logger 141 can compute the physical address 153 using its copy of the mapping parameters in the same way as the address mapper 133 converting the logical address 151 into the physical address 153.

The error log 141 can be used to identify memory cells (e.g., 155) for repair (e.g., 149). For example, the memory sub-system controller 115 can send a command of post package repair 149 to the memory device 130. The command identifies the physical address 153 as the memory location to be repaired. When the memory device 130 has sufficient repair resources, the memory device 130 can perform the requested repair 149 to reduce or eliminate further memory errors at the physical address 153.

Figure 3:
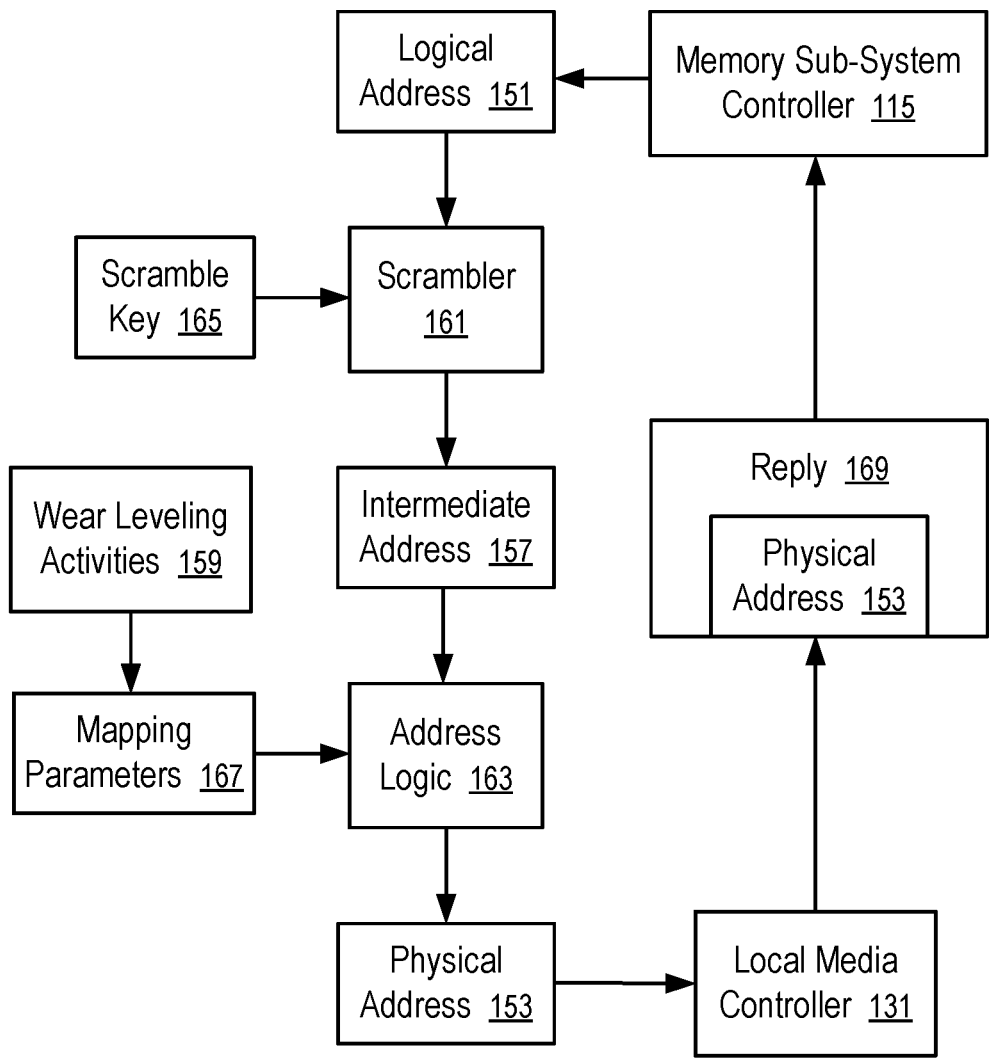
FIG. 3 shows a technique to obtain a physical address associated with a logical address for error logging according to one embodiment.

FIG. 3 shows a technique to obtain a physical address associated with a logical address for error logging according to one embodiment. For example, the technique of processing memory errors as illustrated in FIG. 2 can use the technique of FIG. 3 to obtain the physical address 153 of a memory error 147.

In FIG. 3, a memory sub-system controller 115 uses a logical address 151 to identify a desired location for a memory operation in a memory device 130 in a memory sub-system 110 (e.g., as in FIG. 1).

A scrambler 161 can use a scramble key 165 to scramble the logical address 151 into an intermediate address 157. In general, the scrambler 161 can be implemented in the memory sub-system controller 115 outside of the memory device 130, or in the local media controller 131 in the memory device 130.

An address logic 163 (e.g., part of the address mapper 133) in the local media controller can be configured to map the intermediate address 157 to the physical address 153 through algebraic calculations (e.g., addition, comparison, and selections, but without multiplication). The mapping performed by the address logic 163 is controlled by mapping parameters 167, which can be changed in response to wear leveling activities 159. Thus, before and after wear leveling activities 159, the same logical address 151 can be mapped to different physical addresses (e.g., 153).

In FIG. 3, the local media controller 131 is configured to provide the physical address 153 to the memory sub-system controller 115 via a reply 169. The reply 169 is generated in response to a command 143 from the memory sub-system controller 115 identifying the logical address 151. For example, the command 143 can be a read command to retrieve data from the logical address 151. For example, the command 143 can be configured to request the physical address 153 of the logical address 151, after a memory error 147 at the logical address 151 is identified. When the request is sent before a wear leveling activity 159 changes the mapping between the logical address 151 and the physical address 153, the reply 169 can contain the correct physical address 153 representing the memory cells having the memory error 147.

Figure 4:
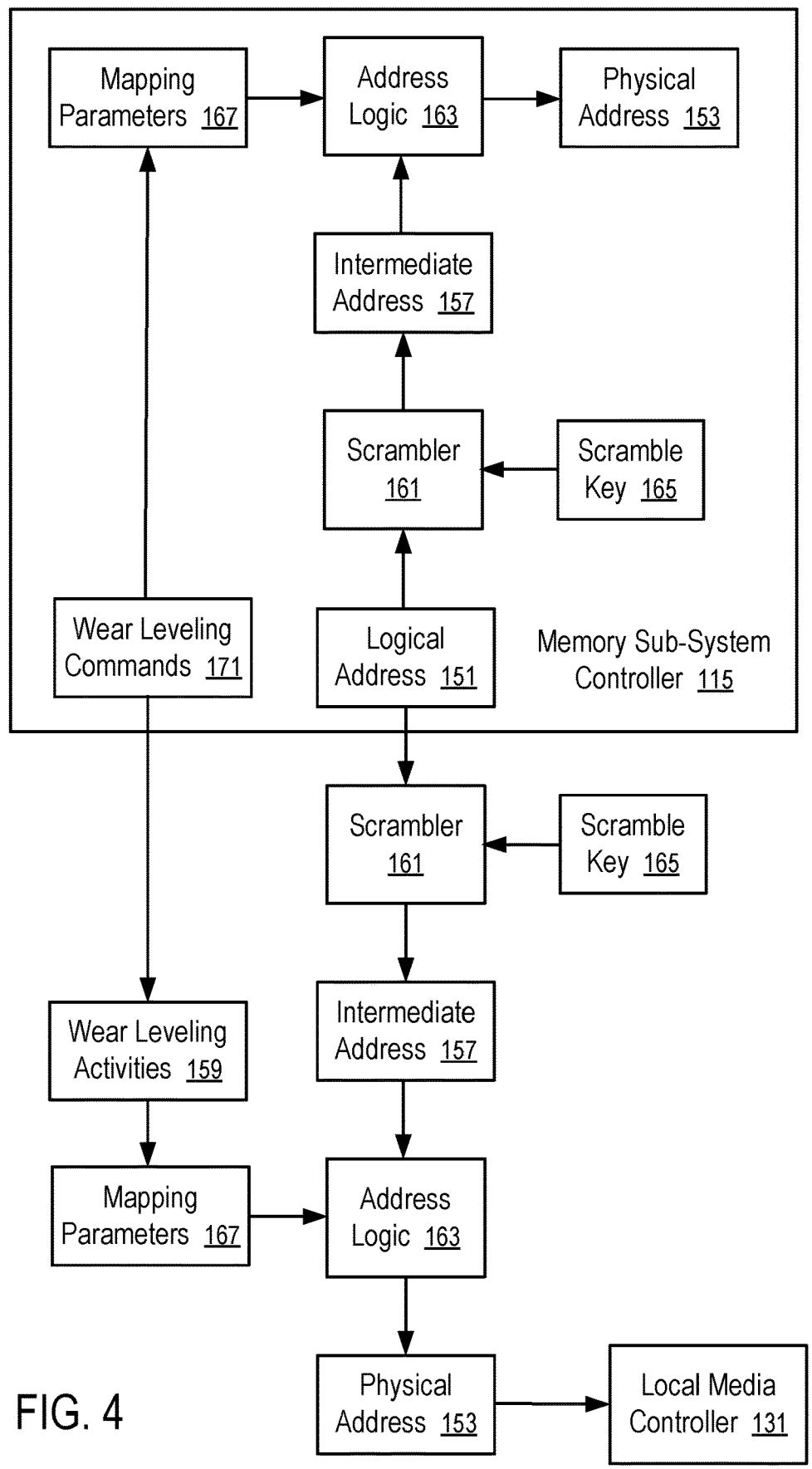
FIG. 4 shows another technique to obtain a physical address associated with a logical address for error logging according to one embodiment.

FIG. 4 shows another technique to obtain a physical address associated with a logical address for error logging according to one embodiment. For example, the technique of processing memory errors as illustrated in FIG. 2 can use the technique of FIG. 4 to obtain the physical address 153 of a memory error 147.

In FIG. 4, the memory sub-system controller 115 has a set of mapping parameters 167 in synchronization with the mapping parameters 167 used by the address logic 163 to map the intermediate address 157 to the physical address 153.

For example, during a power up operation of the memory sub-system 110, the memory sub-system controller 115 can request the memory device 130 to provide a copy of the mapping parameters 167. Alternatively, during the initialization of the memory device 130 for use in the memory sub-system 110, the memory sub-system controller 115 generates the initial set of mapping parameters 167 and instruct the memory device 130 to use the initial set of mapping parameters 167. In another implementation, a manufacturer of the memory sub-system 110 can configure the memory device 130 and the memory sub-system controller 115 to start using a same set of mapping parameters. Similarly, the memory sub-system controller 115 and the memory device 130 can both have the scramble key 165.

Subsequently, when a wear leveling command 171 from the memory sub-system controller 115 is successfully executed in the memory device 130 to change the mapping parameters 167, the memory sub-system controller 115 can make the same adjustment to its set of mapping parameters 167. Thus, where a memory error 147 is initially identified to be at the logical address 151, the memory sub-system controller 115 use its scrambler 161 and address logic 163 to generate the physical address 153 in the same way as the physical address 153 is generated in the local media controller 131.

Figure 5:
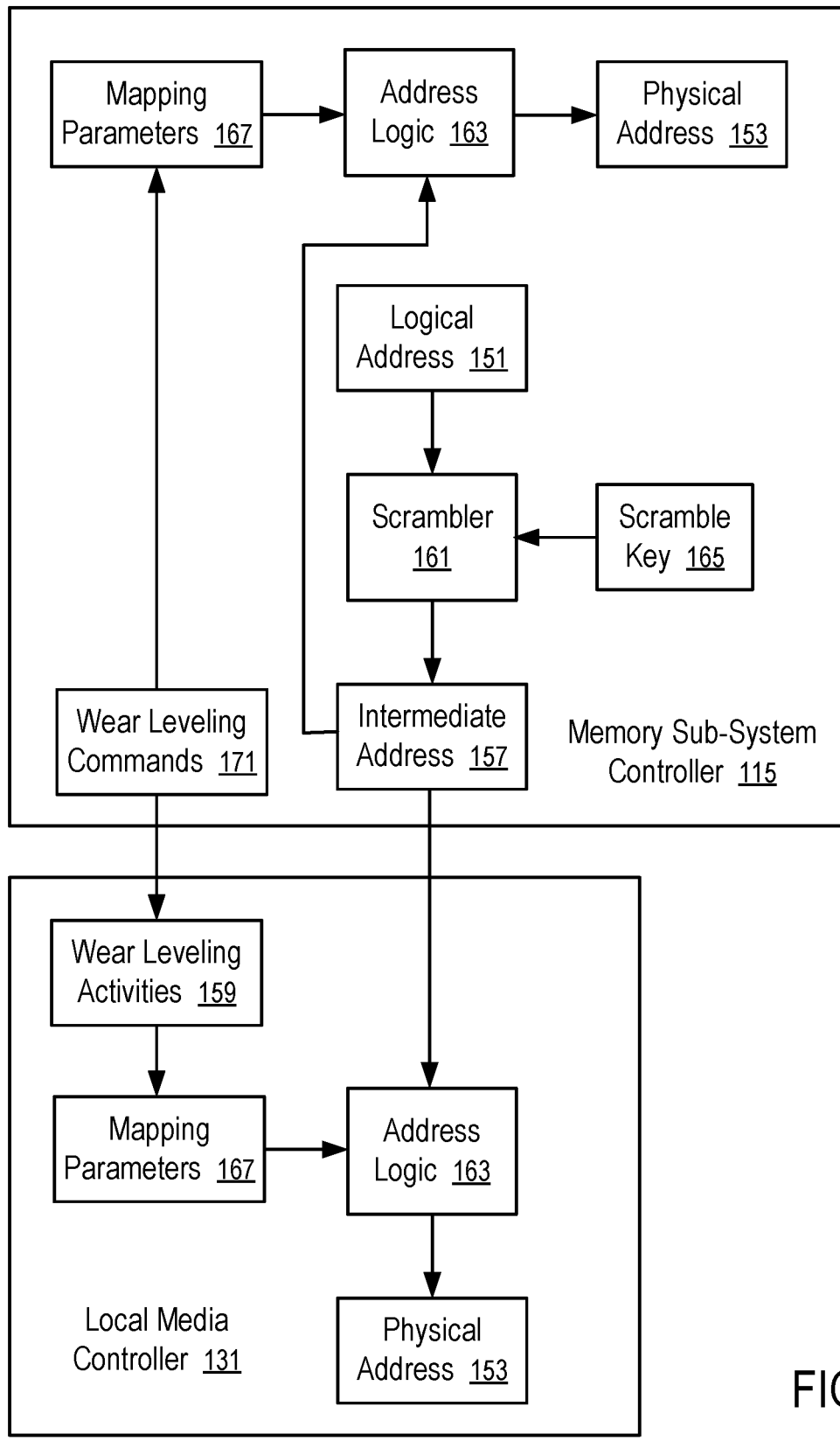
FIG. 5 shows a further technique to obtain a physical address associated with a logical address for error logging according to one embodiment.

FIG. 5 shows a further technique to obtain a physical address associated with a logical address for error logging according to one embodiment. For example, the technique of processing memory errors as illustrated in FIG. 2 can use the technique of FIG. 5 to obtain the physical address 153 of a memory error 147.

In FIG. 5, the memory sub-system controller 115 is configured with a scrambler 161 to generate an intermediate address 157 from the logical address 151. Instead of transmitting the logical address 151 to the memory device 130, the memory sub-system controller 115 provides a command with the intermediate address 157 to the local media controller 131 of the memory device 130. Thus, the memory device 130 does not need a scrambler 161. The address logic 163 of the local media controller 131 can convert the physical address 153.

In FIG. 5, the memory sub-system controller 115 and the local media controller 131 can both keep a synchronized copy of mapping parameters 167 to control their address logic 163 (e.g., as in FIG. 4). Thus, when a memory error 147 is identified at the logical address 151, the memory sub-system controller 115 can compute the correct physical address 153 independent of the memory device 130.

Figure 6:
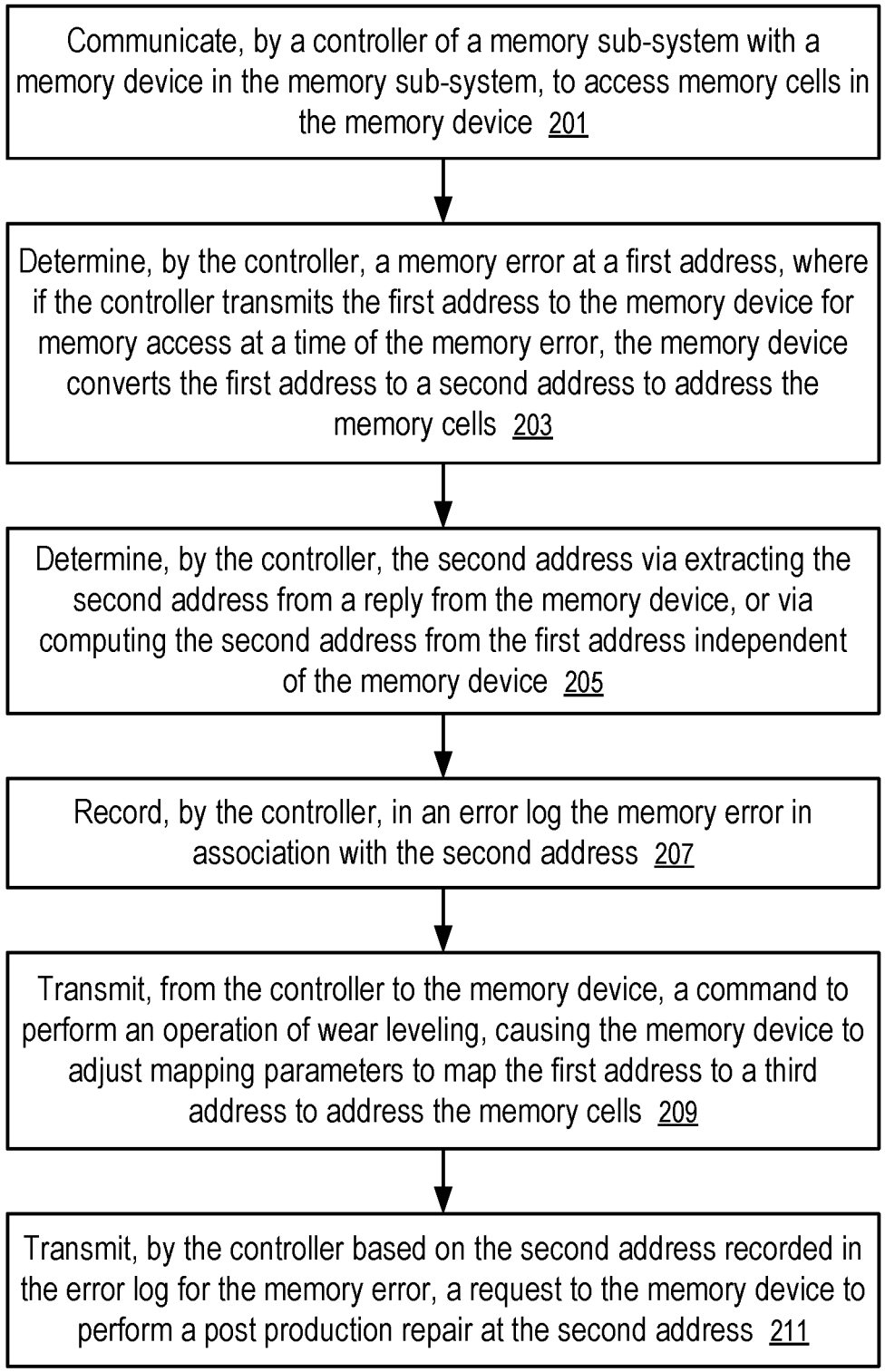
FIG. 6 shows a method to log memory errors according to one embodiment.

FIG. 6 shows a method to log memory errors according to one embodiment. For example, the method of FIG. 6 can be implemented in a computing system 100 of FIG. 1 using the techniques illustrated in FIG. 2 to FIG. 5.

At block 201, a controller 115 of a memory sub-system 110 communicates with a memory device 130 in the memory sub-system 110 to access memory cells (e.g., 155) in the memory device 130.

For example, the controller 115 can send a read command (e.g., 143) to the memory device 130 to retrieve data from a logical address 151. The memory device 130 can determine memory data 145 based on the status of memory cells 155 at physical address 153 corresponding to the logical address 151. If there is an error in the memory data 145 (e.g., determined via decoding the memory data 145 using an Error Correction Code (ECC)), a memory error 147 can be identified at the logical address 151.

At block 203, the controller 115 determines a memory error 147 at a first address (e.g., logical address 151). If the controller 115 transmits the first address (e.g., logical address 151) to the memory device 130 for memory access at a time of the memory error 147, the memory device 130 converts the first address (e.g., logical address 151) to a second address (e.g., physical address 153) to address the memory cells (e.g., 155).

In general, the physical address corresponding the logical address 151 of the memory error 147 can change over time, as a result of wear leveling activities 159. To correctly identify the location of the memory error 147, the physical address 153 of the memory error 147 is to be determined for the logical address 151 before the logical address 151 is to be mapped to a different physical address.

At block 205, the controller 115 determines the second address (e.g., physical address 153) via extracting the second address (e.g., physical address 153) from a reply (e.g., 169) from the memory device 130 (e.g., as in FIG. 3), or via computing the second address (e.g., physical address 153) from the first address (e.g., logical address 151) independent of the memory device 130 (e.g., as in FIG. 4 and FIG. 5).

For example, if the memory device 130 detects the memory error 147 in executing a read command (e.g., 143) from the controller 115, the memory device 130 can report the physical address 153 in a reply 169 to the read command (e.g., 143).

For example, if the controller 115 detects the memory error 147 from decoding the memory data 145, the controller 115 can send a subsequent command following the read command (e.g., 143) to request the physical address 153 of the logical address 151. In response, the memory device 130 can provide the physical address 153 in a reply (e.g., 169).

In some embodiments, the controller 115 can track the mapping parameters 167 used by the memory device 130 to compute physical addresses (e.g., 153) from logical addresses (e.g., 151), as in FIG. 4 and FIG. 5. Using the tracked mapping parameters 167, the controller 115 can compute the physical address 153 of the memory error 147 independent from the memory device 130. Optionally, the computation of the physical address 153 from the logical address 151 can include scrambling the logical address 151 to generate an intermediate address 157. The physical address 153 can be calculated from the intermediate address 157 using mapping parameters 167 (e.g., an offset, a pointer) and calculations without multiplication.

At block 207, the controller 115 records, in an error log 141, the memory error 147 in association with the second address (e.g., physical address 153).

Since the physical address 153 of the memory error 147 does not change over time (e.g., due to wear leveling activities 159), the physical address 153 recorded in the error log 141 for the memory error 147 is accurate in identifying the location of the memory error 147 even after wear leveling activities 159.

At block 209, the controller 115 transmits to the memory device 130 a command (e.g., 171) to perform an operation of wear leveling. Execution of the command (e.g., 171) can cause the memory device 130 to adjust mapping parameters (e.g., 167) to map the first address (e.g., logical address 151) to a third address (e.g., different from the physical address 153) to address the memory cells (e.g., memory cells different from those having the memory error 147).

Optionally, the controller 115 can track the mapping parameters (e.g., 167) used in the memory device 130 to have the capability to independently calculate physical addresses (e.g., 153) of logical addresses (e.g., 151). When the memory device 130 performs a wear leveling operation in accordance with a command (e.g., 171) from the controller 115, the controller 115 can make the same changes to its tracked mapping parameters 167 in a same way as the memory device 130 making the corresponding changes in the memory device 130.

The controller 115 and the memory device 130 can communicate with each other to establish an initial set of synchronized mapping parameters 167. For example, the controller 115 can instruct the memory device 130 to use the initial set of mapping parameters 167 when the memory device 130 is initialized for used in the memory sub-system 110. For example, the controller 115 can obtain the initial set of mapping parameters 167 in response to a power up event in the memory sub-system 110.

The communications of the initial set of mapping parameters 167 can be secured via encryption. The encryption key used to secure the communications can be based on a secret arrayed to be known to the controller 115 and the memory device 130 during the manufacturing of the memory sub-system 110.

The wear leveling activities 159 can change the mapping from logical addresses of data as known to the controller 115 to physical addresses of memory cells actually storing the data. The error logger 141 has a record of the physical address 153 of the memory cells 155 having the memory errors 147. Since the physical address of the memory cells having the memory error 147 does not change before and after the wear leveling activities 159, such activities have no impact on the accuracy of the recorded memory error location. After the wear leveling activities 159, the controller 115 can still use the recorded physical address 153 to specify the memory error location (e.g., for post package repair).

At block 211, the controller 115 transmits, based on the second address (e.g., physical address 153) recorded in the error log 141 for the memory error 147, a request (e.g., repair 149) to the memory device 130 to perform a post package repair at the second address (e.g., physical address 153).

Figure 7:
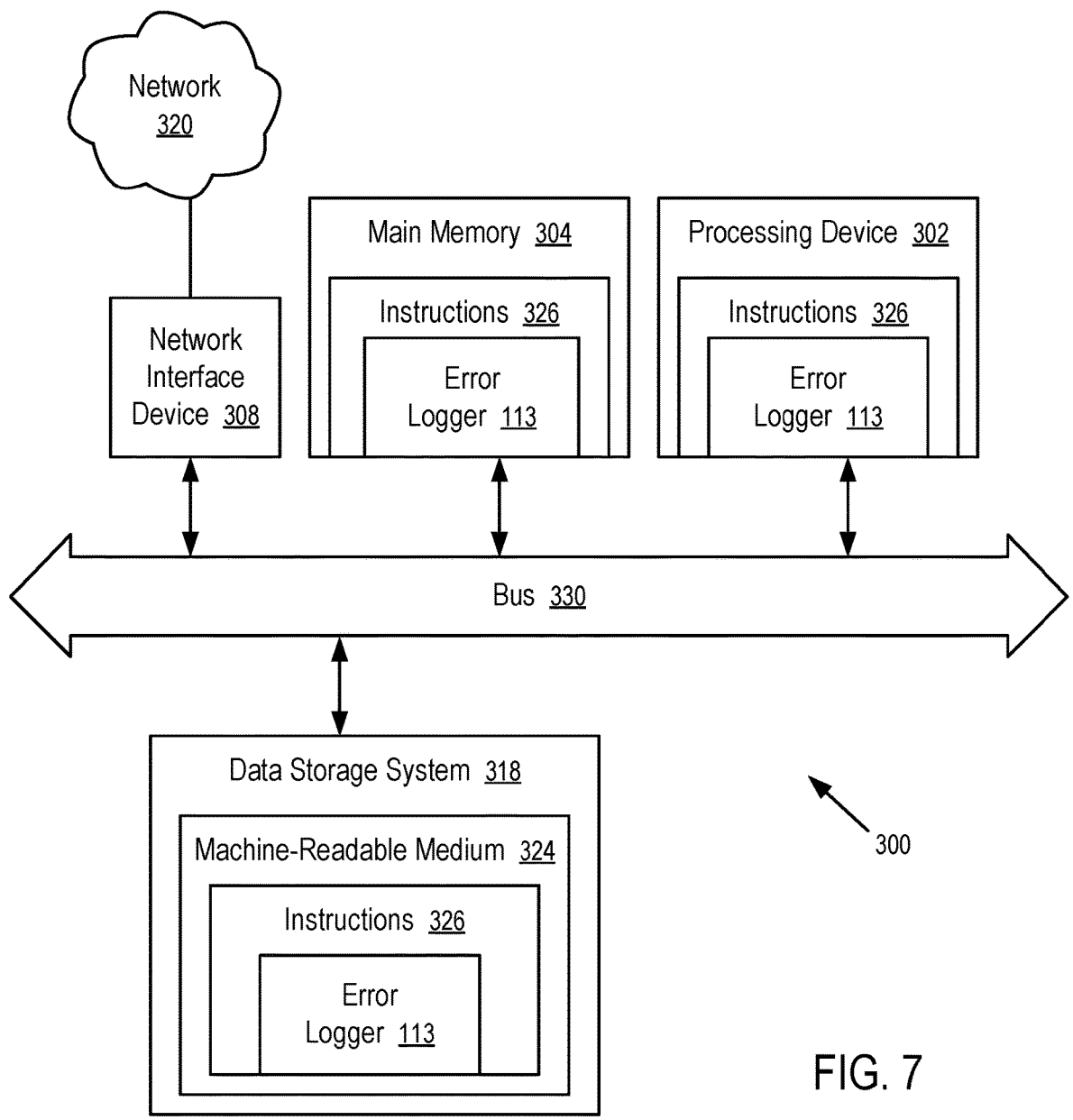
FIG. 7 is a block diagram of an example computer system in which embodiments of the present disclosure can operate.

FIG. 7 illustrates an example machine of a computer system 300 within which a set of instructions, for causing the machine to perform any one or more of the methodologies discussed herein, can be executed. In some embodiments, the computer system 300 can correspond to a host system (e.g., the host system 120 of FIG. 1) that includes, is coupled to, or utilizes a memory sub-system (e.g., the memory sub-system 110 of FIG. 1) or can be used to perform the operations of an error logger 113 (e.g., to execute instructions to perform operations corresponding to the error logger 113 described with reference to FIG. 1-FIG. 6). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 300 includes a processing device 302, a main memory 304 (e.g., read-only memory (ROM), flash memory, dynamic random access memory (DRAM) such as synchronous DRAM (SDRAM) or Rambus DRAM (RDRAM), static random access memory (SRAM), etc.), and a data storage system 318, which communicate with each other via a bus 330 (which can include multiple buses).

Processing device 302 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 302 can also be one or more special-purpose processing devices such as an application specific integrated circuit (ASIC), a field programmable gate array (FPGA), a digital signal processor (DSP), network processor, or the like. The processing device 302 is configured to execute instructions 326 for performing the operations and steps discussed herein. The computer system 300 can further include a network interface device 308 to communicate over the network 320.

The data storage system 318 can include a machine-readable medium 324 (also known as a computer-readable medium) on which is stored one or more sets of instructions 326 or software embodying any one or more of the methodologies or functions described herein. The instructions 326 can also reside, completely or at least partially, within the main memory 304 and/or within the processing device 302 during execution thereof by the computer system 300, the main memory 304 and the processing device 302 also constituting machine-readable storage media. The machine-readable medium 324, data storage system 318, and/or main memory 304 can correspond to the memory sub-system 110 of FIG. 1.

In one embodiment, the instructions 326 include instructions to implement functionality corresponding to an error logger 113 (e.g., the error logger 113 described with reference to FIG. 1-FIG. 6). While the machine-readable medium 324 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer.

Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In this description, various functions and operations are described as being performed by or caused by computer instructions to simplify description. However, those skilled in the art will recognize what is meant by such expressions is that the functions result from execution of the computer instructions by one or more controllers or processors, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising:
   communicating, by a controller of a memory sub-system with a memory device in the memory sub-system, to access memory cells in the memory device;
   determining, by the controller, a memory error at a first address, wherein if the controller transmits the first address to the memory device for memory access at a time of the memory error, the memory device converts the first address to a second address to address the memory cells;
   determining, by the controller, the second address; and
   recording, by the controller, in an error log the memory error in association with the second address.

2. The method of claim 1, further comprising:
   transmitting, from the controller to the memory device, a command to perform an operation of wear leveling; and
   adjusting, by the controller in a same way as the memory device, mapping parameters usable to compute a third address from the first address, wherein after the operation of wear leveling, the memory device is configured to convert the first address to the third address to address memory cells if the controller provides the first address in a command to access memory.

3. The method of claim 2, wherein the determining of the second address comprises:
   computing, by the controller, the second address from the first address.

4. The method of claim 3, further comprising:
   receiving a reply to a read command;
   wherein the first address is identified to the memory device for execution of the read command; and
   wherein the reply includes an indication of the memory error and the second address.

5. The method of claim 3, further comprising:
   transmitting a read command from the controller to the memory device, with the first address identified by the controller for execution of the read command in the memory device, wherein the memory device converts the read command into the second address to retrieve data according to the read command;
   receiving, by the controller from the memory device, the data; and
   decoding, by the controller, the data to identify the memory error.

6. The method of claim 3, wherein the determining of the second address comprises:
   transmitting, by the controller, a further command identifying the first address to request for the second address; and
   receiving, from the memory device, a reply to the further command, the reply containing the second address.

7. The method of claim 3, wherein the computing of the second address from the first address comprises:
   scrambling the first address to generate an intermediate address according to a scramble key; and
   performing an algebraic calculation to convert the intermediate address to the second address using an offset.

8. The method of claim 7, wherein the mapping parameters include the offset.

9. The method of claim 7, further comprising:
   requesting, by the controller from the memory device in response to a power up event in the memory sub-system, first parameters used in the memory device to map addresses; and
   adjusting the first parameters in the controller for synchronization with corresponding parameters used in the memory device.

10. The method of claim 9, further comprising:
    receiving, by the controller from the memory device, the first parameters in an encrypted form.

11. The method of claim 7, further comprising:
    generating, by the controller in response to a request to initialize the memory device in the memory sub-system, first parameters;

instructing, by the controller, the memory device to use the first parameters to map addresses; and adjusting the first parameters in the controller for synchronization with corresponding parameters used in the memory device.

12. The method of claim 7, further comprising:

transmitting, by the controller based on the second address recorded in the error log for the memory error, a request to the memory device to perform a post package repair at the second address.

13. A memory sub-system, comprising:

a controller; and a memory device coupled to the controller to receive communications to access memory cells in the memory device;

wherein the controller is configured to determine a memory error at a first address through the communications;

wherein the memory device is configured to, if the controller transmits the first address to the memory device for memory access at a time of the memory error, convert the first address to a second address to address the memory cells; and wherein in response to the memory error being identified at the first address, the controller is configured to determine the second address and record, in an error log, the memory error in association with the second address.

14. The memory sub-system of claim 13, wherein the controller is configured to determine the second address from a reply received from the memory device responsive to a command having the first address.

15. The memory sub-system of claim 13, wherein the controller is configured to compute the second address in a same way as the memory device.

16. The memory sub-system of claim 15, wherein the memory device is configured to change, during wear leveling operations, parameters used to map addresses received from the controller in access requests to addresses used to select memory cells in performing the access requests; and the controller is configured to change corresponding parameters maintained by the controller, in response to the wear leveling operations, in a same way as the memory device.

17. The memory sub-system of claim 15, wherein the memory device and the controller are configured to communicate with each other to maintain a synchronized set of mapping parameters to map logical addresses of data stored in the memory device to physical addresses of memory cells; the first address is a logical address; and the second address is a physical addresses.

18. A non-transitory computer storage medium storing instructions, which when executed by a controller of a memory sub-system, cause the memory sub-system to perform a method, comprising:

communicating, with a memory device in the memory sub-system, to access memory cells in the memory device;

determining a memory error at a first address, wherein if the controller transmits the first address to the memory device for memory access at a time of the memory error, the memory device converts the first address to a second address to address the memory cells;

determining the second address; and recording an error log the memory error in association with the second address.

19. The non-transitory computer storage medium of claim 18, wherein determining of the second address comprises:

determining the second address from a reply received from the memory device responsive to a command having the first address.

20. The non-transitory computer storage medium of claim 18, wherein determining of the second address comprises:

computing the second address in a same way as the memory device.

* * * * *